(12) United States Patent
Zhang et al.

(10) Patent No.: US 12,060,784 B2
(45) Date of Patent: *Aug. 13, 2024

(54) SWITCHABLE APPARATUS, WELL SITE AND CONTROL METHOD THEREOF, DEVICE, AND STORAGE MEDIUM

(71) Applicant: YANTAI JEREH PETROLEUM EQUIPMENT & TECHNOLOGIES CO., LTD., Shandong (CN)

(72) Inventors: Peng Zhang, Shandong (CN); Liang Lv, Shandong (CN); Rikui Zhang, Shandong (CN); Zhuqing Mao, Shandong (CN); Jianwei Wang, Shandong (CN); Chunqiang Lan, Shandong (CN); Yipeng Wu, Shandong (CN); Xincheng Li, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,360

(22) Filed: Mar. 15, 2023

(65) Prior Publication Data

US 2023/0220757 A1 Jul. 13, 2023

Related U.S. Application Data

(63) Continuation of application No. 17/370,856, filed on Jul. 8, 2021, now Pat. No. 11,608,726.

(30) Foreign Application Priority Data

Jan. 11, 2021 (CN) .......................... 202110030394.5
Apr. 2, 2021 (CN) .......................... 202110360761.8

(51) Int. Cl.
*E21B 43/26* (2006.01)
*E21B 41/00* (2006.01)
(Continued)

(52) U.S. Cl.
CPC ...... *E21B 43/2607* (2020.05); *E21B 41/0085* (2013.01); *F01D 15/10* (2013.01);
(Continued)

(58) Field of Classification Search
CPC .. E21B 43/2607; E21B 41/0085; E21B 43/26; F01D 15/10; F01D 21/00;
(Continued)

(56) References Cited

U.S. PATENT DOCUMENTS 2,988,153 A 6/1961 Haworth et al.
3,418,485 A 12/1968 Anderson et al.
(Continued)

FOREIGN PATENT DOCUMENTS

CA 2944968 8/2016
CN 2625578 Y 7/2004
(Continued)

OTHER PUBLICATIONS

International Search Report, dated Jun. 5, 2020, pp. 1-4, issued in International Patent Application No. PCT/CN2019/107019, China Intellectual Property Administration, Beijing, China.
(Continued)

*Primary Examiner* — James G Sayre
(74) *Attorney, Agent, or Firm* — Crowell & Moring LLP

(57) ABSTRACT

A fracturing and power generation switchable apparatus, a well site, a control method of the well site, a control device, and a storage medium are provided. The fracturing and power generation switchable apparatus includes a power device, a speed transmission device, and a bearing base. The switchable apparatus is configured to switch between a first state and a second state, under the first state, the plunger pump is fixed on the bearing base and is connected with the speed transmission device, and the switchable apparatus is supplied as a fracturing apparatus, and under the second
(Continued)

state, the electric generator is fixed on the bearing base and is connected with the speed transmission device, and the switchable apparatus is supplied as a power generation apparatus.

20 Claims, 7 Drawing Sheets

(51) Int. Cl.
    *F01D 15/10*     (2006.01)
    *F04B 17/03*     (2006.01)
    *F04B 23/06*     (2006.01)
    *F04B 49/00*     (2006.01)
    *H02K 7/18*     (2006.01)

(52) U.S. Cl.
    CPC .............. *F04B 17/03* (2013.01); *F04B 23/06* (2013.01); *F04B 49/007* (2013.01); *H02K 7/1823* (2013.01); *E21B 43/26* (2013.01)

(58) Field of Classification Search
    CPC .......... F01D 13/00; F01D 15/08; F01D 15/12; F04B 17/03; F04B 23/06; F04B 49/007; F04B 9/02; F04B 17/05; H02K 7/1823
    See application file for complete search history.

(56) References Cited

U.S. PATENT DOCUMENTS

| | | |
|---|---|---|
| 3,791,682 A | 2/1974 | Mitchell |
| 3,881,841 A | 5/1975 | Straniti |
| 4,341,071 A | 7/1982 | Abo et al. |
| 5,435,975 A | 7/1995 | Bastos |
| 5,517,822 A | 5/1996 | Haws et al. |
| 5,709,076 A | 1/1998 | Lawlor |
| 6,230,481 B1 | 5/2001 | Jahr |
| 6,446,425 B1 | 9/2002 | Lawlor |
| 7,036,318 B1 | 5/2006 | Munson, Jr. |
| 7,506,574 B2 | 3/2009 | Jensen et al. |
| 7,552,903 B2 | 6/2009 | Dunn et al. |
| 7,845,413 B2 | 12/2010 | Shampine et al. |
| 8,567,354 B2 | 10/2013 | Kealy et al. |
| 8,621,873 B2 | 1/2014 | Robertson et al. |
| 8,801,394 B2 | 8/2014 | Anderson |
| 9,534,473 B2 | 1/2017 | Morris et al. |
| 10,030,579 B2 | 7/2018 | Austin et al. |
| 10,060,293 B2 | 8/2018 | Del Bono |
| 10,371,012 B2 | 8/2019 | Davis et al. |
| 10,954,770 B1 | 3/2021 | Yeung |
| 10,961,993 B1 | 3/2021 | Ji et al. |
| 10,968,837 B1 | 4/2021 | Yeung et al. |
| 11,111,768 B1 | 9/2021 | Yeung et al. |
| 11,181,046 B1 | 11/2021 | Brooks et al. |
| 11,242,737 B2 | 2/2022 | Zhang |
| 11,608,726 B2* | 3/2023 | Zhang ..................... F04B 23/06 |
| 2003/0004029 A1 | 1/2003 | Lagarde et al. |
| 2003/0171184 A1 | 9/2003 | Wige |
| 2004/0050049 A1 | 3/2004 | Wendt et al. |
| 2005/0221946 A1 | 10/2005 | Mitrovic |
| 2007/0213171 A1 | 9/2007 | Pizzichil et al. |
| 2007/0277982 A1 | 12/2007 | Shampine et al. |
| 2009/0068031 A1 | 3/2009 | Gambier et al. |
| 2010/0071899 A1 | 3/2010 | Coquilleau et al. |
| 2011/0085924 A1 | 4/2011 | Shampine et al. |
| 2011/0171044 A1 | 7/2011 | Flanigan |
| 2013/0112029 A1 | 5/2013 | Slayter et al. |
| 2013/0209236 A1 | 8/2013 | Xu |
| 2014/0013768 A1 | 1/2014 | Laing |
| 2014/0144641 A1 | 5/2014 | Chandler |
| 2014/0174717 A1 | 6/2014 | Broussard et al. |
| 2014/0219824 A1 | 8/2014 | Burnette |
| 2014/0274557 A1 | 9/2014 | Chong |
| 2015/0184591 A1 | 7/2015 | Giancotti et al. |
| 2015/0247421 A1 | 9/2015 | Wojick et al. |
| 2015/0252661 A1 | 9/2015 | Glass |
| 2015/0275891 A1 | 10/2015 | Chong |
| 2015/0377318 A1 | 12/2015 | Byrne |
| 2015/0381013 A1 | 12/2015 | Davies et al. |
| 2016/0047305 A1 | 2/2016 | Wickert et al. |
| 2016/0102581 A1 | 4/2016 | Del Bono |
| 2016/0169322 A1 | 6/2016 | Ono |
| 2016/0177678 A1 | 6/2016 | Morris et al. |
| 2016/0218650 A1 | 7/2016 | Gajanayake et al. |
| 2016/0230525 A1 | 8/2016 | Lestz et al. |
| 2016/0341124 A1 | 11/2016 | Ross et al. |
| 2016/0348479 A1 | 12/2016 | Oehring et al. |
| 2017/0082110 A1 | 3/2017 | Lammers |
| 2017/0089189 A1 | 3/2017 | Norris et al. |
| 2017/0104389 A1 | 4/2017 | Morris et al. |
| 2017/0218727 A1 | 8/2017 | Oehring et al. |
| 2017/0234308 A1 | 8/2017 | Buckley |
| 2017/0292789 A1 | 10/2017 | Hjorth et al. |
| 2018/0111807 A1 | 4/2018 | Snider |
| 2018/0266412 A1 | 9/2018 | Stokkevag et al. |
| 2018/0283464 A1 | 10/2018 | Altamura |
| 2019/0063309 A1 | 2/2019 | Davis |
| 2019/0067991 A1 | 2/2019 | Davis et al. |
| 2019/0068026 A1 | 2/2019 | Davis |
| 2019/0178235 A1 | 6/2019 | Coskrey et al. |
| 2019/0338762 A1 | 11/2019 | Curry et al. |
| 2020/0040878 A1 | 2/2020 | Morris et al. |
| 2020/0049136 A1 | 2/2020 | Stephenson |
| 2020/0056458 A1 | 2/2020 | Mao et al. |
| 2020/0109616 A1 | 4/2020 | Oehring et al. |
| 2020/0325761 A1 | 10/2020 | Williams |
| 2020/0332784 A1 | 10/2020 | Zhang et al. |
| 2020/0340344 A1 | 10/2020 | Reckels et al. |
| 2020/0370633 A1 | 11/2020 | Kumar |
| 2020/0392826 A1 | 12/2020 | Cui et al. |
| 2021/0079902 A1 | 3/2021 | Yeung et al. |
| 2021/0102531 A1 | 4/2021 | Bodishbaugh et al. |
| 2021/0372256 A1 | 12/2021 | Yeung et al. |
| 2021/0404309 A1 | 12/2021 | Yeung et al. |

FOREIGN PATENT DOCUMENTS

| | | |
|---|---|---|
| CN | 201159100 Y | 12/2008 |
| CN | 201646518 U | 11/2010 |
| CN | 201863895 U | 6/2011 |
| CN | 102136778 A | 7/2011 |
| CN | 102602323 A | 7/2012 |
| CN | 202673269 U | 1/2013 |
| CN | 202763319 U | 3/2013 |
| CN | 202926404 U | 5/2013 |
| CN | 202935216 U | 5/2013 |
| CN | 203962367 U | 11/2014 |
| CN | 105065224 A | 11/2015 |
| CN | 205117343 U | 3/2016 |
| CN | 105545666 A | 5/2016 |
| CN | 105703535 A | 6/2016 |
| CN | 106089175 A | 11/2016 |
| CN | 107208557 A | 9/2017 |
| CN | 107544304 A | 1/2018 |
| CN | 107939342 A | 4/2018 |
| CN | 208862781 U | 5/2019 |
| CN | 109869294 A | 6/2019 |
| CN | 109882144 A | 6/2019 |
| CN | 109906305 A | 6/2019 |
| CN | 110118127 A | 8/2019 |
| CN | 110145399 A | 8/2019 |
| CN | 110374745 A | 10/2019 |
| CN | 110469314 A | 11/2019 |
| CN | 110469405 A | 11/2019 |
| CN | 110500255 A | 11/2019 |
| CN | 110513097 A | 11/2019 |
| CN | 209586278 U | 11/2019 |
| CN | 209586287 U | 11/2019 |
| CN | 110735713 A | 1/2020 |
| CN | 110821464 A | 2/2020 |
| CN | 210714958 U | 6/2020 |
| CN | 210985525 A | 7/2020 |
| CN | 111594314 A | 8/2020 |

(56) References Cited

FOREIGN PATENT DOCUMENTS

| | | |
|---|---|---|
| CN | 112682172 A | 4/2021 |
| FR | 2890438 A1 | 3/2013 |
| KR | 101861753 B1 | 5/2018 |

OTHER PUBLICATIONS

International Search Report, dated Jun. 5, 2020, pp. 1-4, issued in International Patent Application No. PCT/CN2019/107020, China Intellectual Property Administration, Beijing, China.
International Search Report, dated Jun. 5, 2020, pp. 1-4, issued in International Patent Application No. PCT/CN2019/107021, China Intellectual Property Administration, Beijing, China.
International Search Report, dated Jun. 10, 2020, pp. 1-4, issued in International Patent Application No. PCT/CN2019/107023, China Intellectual Property Administration, Beijing, China.
International Search Report, dated May 14, 2020, pp. 1-4, issued in International Patent Application No. PCT/CN2019/107026, China Intellectual Property Administration, Beijing, China.
International Search Report, dated Sep. 26, 2021, pp. 1-4, issued in International Patent Application No. PCT/CN2019/095646, China Intellectual Property Administration, Beijing, China.
Ex parte Quayle Office Action mailed May 14, 2024 for U.S. Appl. No. 18/342,318.

* cited by examiner

SWITCHABLE APPARATUS, WELL SITE AND CONTROL METHOD THEREOF, DEVICE, AND STORAGE MEDIUM

The present application is a continuation application and claims the benefit of priority to U.S. patent application Ser. No. 17/370,856 filed on Jul. 8, 2021, which claims priority to Chinese Patent Application No. 202110030394.5 filed on Jan. 11, 2021, and Chinese Patent Application No. 202110360761.8 filed on Apr. 2, 2021. These prior patent applications are incorporated herein by reference as part of the present disclosure in their entireties.

TECHNICAL FIELD

Embodiments of the present disclosure relate to a fracturing and power generation switchable apparatus, a well site and a control method thereof, a device, and a storage medium.

BACKGROUND

In the layout of a conventional fracturing well site, an apparatus uses fuel oil as power fuel, and both a fuel pollution and a noise pollution are serious, which is an inevitable defect. A plurality of turbine fracturing apparatuses are arranged in the layout of the well site, under a case where the plurality of turbine fracturing apparatuses are arranged with both gas turbine engines and fuel oil engines, which is inconvenient for the environmental protection requirements and the control of the fracturing apparatuses.

SUMMARY

At least one embodiment of the present disclosure provides a fracturing and power generation switchable apparatus, and the fracturing and power generation switchable apparatus includes a power device, a speed transmission device, and a bearing base. The speed transmission device is connected with the power device, and the bearing base is configured for carrying and fixing a plunger pump or an electric generator, wherein the switchable apparatus is configured to switch between a first state and a second state, under the first state, the plunger pump is fixed on the bearing base and is connected with the speed transmission device, and the switchable apparatus is supplied as a fracturing apparatus; and under the second state, the electric generator is fixed on the bearing base and is connected with the speed transmission device, and the switchable apparatus is supplied as a power generation apparatus.

For example, in the fracturing and power generation switchable apparatus provided by at least one embodiment of the present disclosure, the bearing base includes a bearing component, a first fixing plate, and a second fixing plate, the first fixing plate and the second fixing plate are arranged on a bearing surface of the bearing component, the bearing component is configured for bearing the plunger pump or the electric generator, the first fixing plate is adapted to fix the plunger pump, and the second fixing plate is adapted to fix the electric generator.

For example, in the fracturing and power generation switchable apparatus provided by at least one embodiment of the present disclosure, each of the electric generator and the plunger pump is detachably provided with a first connection unit, the electric generator is connected with pipelines required for an operation of the electric generator by the first connection unit, and the plunger pump is connected with pipelines required for an operation of the plunger pump by the first connection unit.

For example, in the fracturing and power generation switchable apparatus provided by at least one embodiment of the present disclosure, the first connection unit includes a base and a connection structure, the connection structure is movably connected with the base, the connection structure includes a plurality of interfaces, the plurality of interfaces are configured to connect the pipelines required for the operation of the plunger pump or the pipelines required for the operation of the electric generator, and the plurality of interfaces pass through a plug-in surface of the connection structure, in a case where the connection structure is not connected with the pipelines required for the operation of the electric generator or the pipelines required for the operation of the plunger pump, the plug-in surface of the connection structure overlaps with a surface of the base, wherein the plug-in surface is located at a main surface of the connection structure.

For example, in the fracturing and power generation switchable apparatus provided by at least one embodiment of the present disclosure, the connection structure is rotatably connected with the base, the connection structure is rotatably connected with the base, in a case where the connection structure is connected with the pipelines required for the operation of the electric generator or the pipelines required for the operation of the plunger pump, the plug-in surface of the connection structure rotates toward a side away from the surface of the base, so that the plug-in surface is perpendicular to the surface of the base, and the connection structure is connected with the pipelines required for the operation of the electric generator or the pipelines required for the operation of the plunger pump.

For example, in the fracturing and power generation switchable apparatus provided by at least one embodiment of the present disclosure, the connection structure is movably connected with the base, in a case where the connection structure is connected with the pipelines required for the operation of the electric generator or the pipelines required for the operation of the plunger pump, the plug-in surface of the connection structure moves to a side away from the base, so that an orthographic projection of the plug-in surface of the connection structure on a plane parallel to the surface of the base is at least partially outside the surface of the base, and the connection structure is connected with the pipelines required for the operation of the electric generator or the pipelines required for the operation of the plunger pump.

For example, in the fracturing and power generation switchable apparatus provided by at least one embodiment of the present disclosure, the plurality of interfaces are configured to connect with at least one selected from the group consisting of lubrication pipelines, control cables, sensor wires, and hydraulic pipelines.

For example, in the fracturing and power generation switchable apparatus provided by at least one embodiment of the present disclosure, the power device includes a turbine engine, and the speed transmission device includes a speed reducer, an output shaft of the turbine engine is connected with an input shaft of the speed reducer by a flange, and an output shaft of the speed reducer is directly connected with an input hole of the electric generator or an input shaft of the plunger pump, or the output shaft of the speed reducer is connected with the input hole of the electric generator or the input shaft of the plunger pump by a coupler.

For example, in the fracturing and power generation switchable apparatus provided by at least one embodiment of the present disclosure, a second connection unit is detachably provided at the switchable apparatus, and the second connection unit is configured to connect with an electric generator that supplies power to the switchable apparatus.

At least one embodiment of the present disclosure further provides a well site, and the well sit includes a manifold and a plurality of fracturing and power generation switchable apparatuses each of which is the fracturing and power generation switchable apparatus according to any one described above. The manifold is configured to transport fracturing fluid to a wellhead, the plurality of fracturing and power generation switchable apparatuses are provided at two sides of the manifold and are connected with the manifold, and at least one of the plurality of fracturing and power generation switchable apparatuses is configured to work in the first state.

At least one embodiment of the present disclosure further provides A control method of the well site according to any one described above, including: in response to displacement data output by each of the plurality of switchable apparatuses in the first state, generating a displacement information, wherein the displacement information includes the displacement data of each of the plurality of switchable apparatuses in the first state and a total displacement value obtained by summing all of the displacement data; obtaining a displacement demand input from outside, and in a case where the total displacement value is greater than or equal to the displacement demand, outputting a standard-compliant information, otherwise, outputting a non-standard-compliant information; in response to the standard-compliant information, based on the displacement information and the displacement demand, filtering out at least one switchable apparatus from the plurality of switchable apparatuses in the first state to generate an alternative information, wherein the alternative information includes the number of the switchable apparatuses to be switched from the first state to the second state; and in a case where the number of the switchable apparatuses in the alternative information is greater than a number of electric generators in demand, filtering switchable apparatuses with a same number of the electric generators in demand in the alternative information and generating a replacement information.

For example, in the control method provided by at least one embodiment of the present disclosure, in response to the replacement information, filtered switchable apparatuses with the same number of electric generators in demand are switched to the second state.

For example, in the control method provided by at least one embodiment of the present disclosure, in response to the standard-compliant information, based on the displacement information and the displacement demand, filtering out at least one switchable apparatus from the plurality of switchable apparatuses in the first state to generate the alternative information, including: in response to the standard-compliant information, based on the displacement information and the displacement demand, calculating a difference between the total displacement value and the displacement demand, and recording the difference as a vacant displacement; periodically filtering out at least one switchable apparatus from the plurality of switchable apparatuses in the first state to generate a filtering result; and generating the alternative information with the filtering result.

For example, in the control method provided by at least one embodiment of the present disclosure, a filtering condition for periodically filtering out at least one switchable apparatus from the plurality of switchable apparatuses in the first state includes: periodically filtering out at least one switchable apparatus according to the displacement data of the plurality of switchable apparatuses in the first state in the order of displacement data of the plurality of switchable apparatuses from small to large, wherein a sum of the displacement data of at least one switchable apparatus filtered is smaller than the vacant displacement.

For example, the control method provided by at least one embodiment of the present disclosure, further includes: in a case where at least one switchable apparatus in the well site in the first state is powered off, in a case where the standard-compliant information is not received, in response to single power data and power demand data input from outside, determining the number of electric generators in demand by rounding up a calculation result of dividing the power demand data by the single power data.

For example, in the control method provided by at least one embodiment of the present disclosure, in a case where the number of the switchable apparatuses in the alternative information is not greater than the number of the electric generators in demand, the replacement information is generated based on all of the switchable apparatuses of the alternative information, and a warning information is generated and output at the same time.

For example, in the control method provided by at least one embodiment of the present disclosure, filtering switchable apparatuses with the same number of the electric generators in demand in the alternative information and generating the replacement information, includes: filtering the switchable apparatuses with the same number of electric generators in demand according to an order from small to large of the displacement data of the switchable apparatuses in the first state in the alternative information; and generating the replacement information based on the filtered switchable apparatuses with the same number of the electric generators in demand.

For example, the control method provided by at least one embodiment of the present disclosure, further includes: in a case where the switchable apparatuses in the first state in the well site are powered off and the standard-compliant information or the non-standard-compliant information is not output, outputting an abnormal information.

At least one embodiment of the present disclosure further provides a control device, including: a processor; and a memory, wherein a computer executable code is stored in the memory, in a case where the computer executable code is run by the processor, the control method according to any one described above is executed.

At least one embodiment of the present disclosure further provides a computer readable storage medium, having an executable code stored thereon, wherein in a case where the executable code is executed by a processor, the processor executes the control method according to any one described above.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
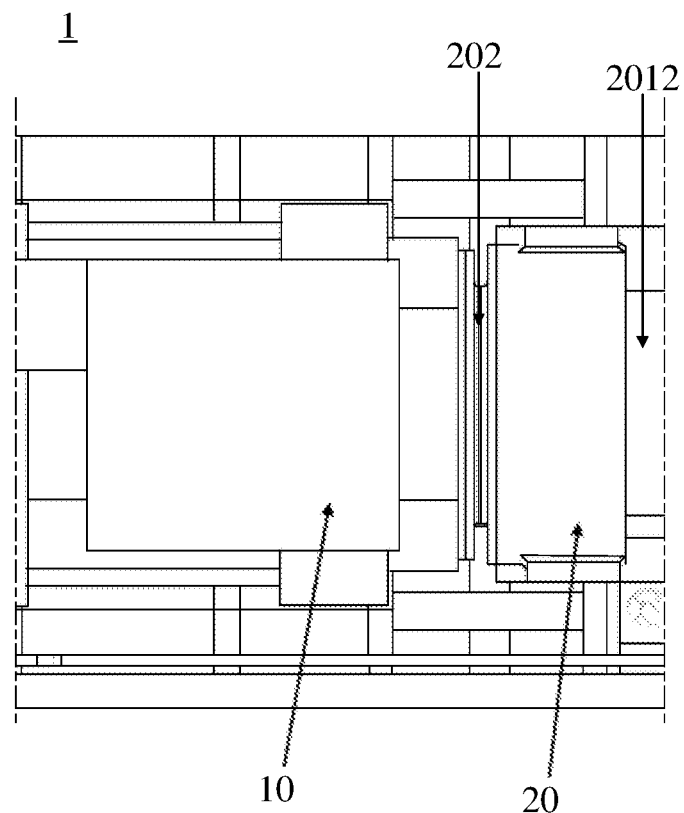
FIG. 1 is a structural schematic diagram of a fracturing and power generation switchable apparatus provided by at least one embodiment of the present disclosure.

In order to make objectives, technical details, and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Similarly, similar terms such as "a", "an", or "the", etc., do not indicate the limitation of quantity, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects.

In a layout of an electric drive fracturing well site, a plurality of turbine fracturing apparatuses are all use an electric drive mode. If a problem is occurred in a power generator, or a frequency conversion apparatus, the entire well site will be paralyzed, and the fracturing operation will be terminated, which is very dangerous. The electric generator used in the well site uses gas or oil as power fuel, compared with the turbine apparatus, intermediate links are added, and the efficiency is reduced.

At least one embodiment of the present disclosure provides a fracturing and power generation switchable apparatus, the fracturing and power generation switchable apparatus includes a power device, a speed transmission device and a bearing base. The speed transmission device is connected with the power device, the bearing base is configured for carrying and fixing a plunger pump or an electric generator, and the switchable apparatus is configured to switch between the first state and the second state, under the first state, the plunger pump is fixed on the bearing base and is connected with the speed transmission device, and the switchable apparatus is supplied as a fracturing apparatus. Under the second state, the electric generator is fixed on the bearing base and is connected with the speed transmission device, and the switchable apparatus is supplied as a power generation apparatus.

According to the fracturing and power generation switchable apparatus provided by any one of the above-mentioned embodiments of the present disclosure, the speed transmission device can be connected with the plunger pump, so that the switchable apparatus can be supplied as a fracturing apparatus, or the speed transmission device can be connected with the electric generator, so that the switchable apparatus can be supplied as a power generation apparatus, thereby reducing the number of well site apparatuses and saving space.

At least one embodiment of the present disclosure further provides a well site, and the well site includes: a manifold and a plurality of fracturing and power generation switchable apparatus each of which is the fracturing and power generation switchable apparatus as described above. The manifold is configured to transport fracturing fluid to a wellhead, the plurality of switchable apparatuses are arranged at two sides of the manifold and are connected with the manifold, and at least one of the plurality of switchable apparatuses operates is configured to work the first state.

At least one embodiment of the present disclosure further provides a control method of the well site as described above, which includes: in response to displacement data output by each of the plurality of switchable apparatuses in the first state, generating a displacement information, wherein the displacement information includes the displacement data of each of the plurality of switchable apparatuses in the first state and a total displacement value obtained by summing all of the displacement data; obtaining a displacement demand input from outside, and, in a case where the total displacement value is greater than or equal to the displacement demand, outputting a standard-compliant information, otherwise, outputting a non-standard-compliant information; in response to the standard-compliant information, based on the displacement information and the displacement demand, filtering out at least one switchable apparatus from the plurality of switchable apparatuses in the first state to generate an alternative information, wherein the alternative information includes the number of switchable apparatuses to be switched from the first state to the second state; and in the case where the number of the switchable apparatuses in the alternative information is greater than a number of electric generators in demand, filtering switchable apparatuses with a same number of the electric generators in demand in the alternative information and generating a replacement information.

The embodiments and examples of the present disclosure will be described in detail below with reference to the accompanying drawings.

Figure 2A:
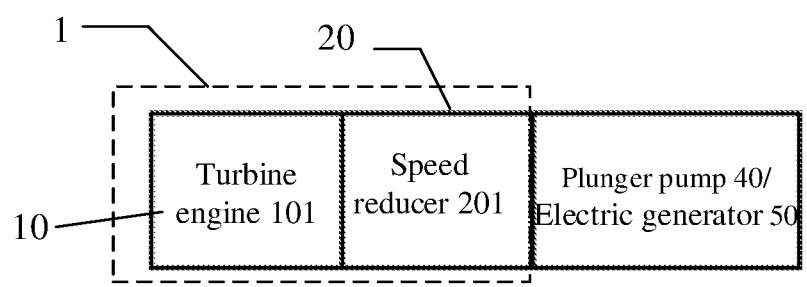
FIG. 2A is a schematic block diagram of a fracturing and power generation switchable apparatus provided by at least one embodiment of the present disclosure.
Figure 2B:
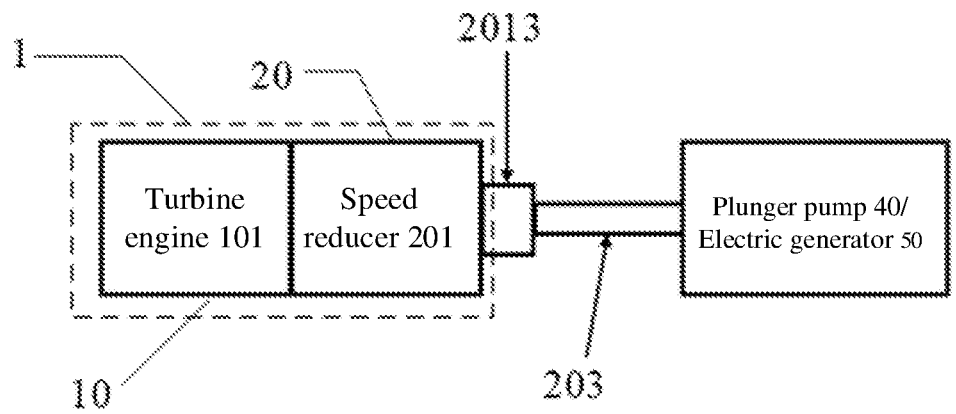
FIG. 2B is a schematic block diagram of a fracturing and power generation switchable apparatus provided by at least one embodiment of the present disclosure.

FIG. 1 is a structural schematic diagram of a fracturing and power generation switchable apparatus provided by at least one embodiment of the present disclosure; FIG. 2A is a schematic block diagram of a fracturing and power generation switchable apparatus provided by at least one embodiment of the present disclosure; FIG. 2B is a schematic block diagram of a fracturing and power generation switchable apparatus provided by at least still one embodiment of the present disclosure; and FIG. 3 is a schematic block diagram of a bearing base provided by at least one embodiment of the present disclosure.

For example, in some embodiments, as shown in FIG. 1, FIG. 2A, and FIG. 2B, the fracturing and power generation switchable apparatus 1 includes a power device 10 and a speed transmission device 20. The power device 10 is connected with the speed transmission device 20, the power device 10 transmits a driving force generating by the power device 10 to the speed transmission device 20, the speed transmission device 20 converts the driving force into an appropriate rotation speed range and transmits the driving force to a next-stage unit. For example, an output end of the speed transmission device 20 is connected with a plunger pump 40 or an electric generator 50.

Figure 3:
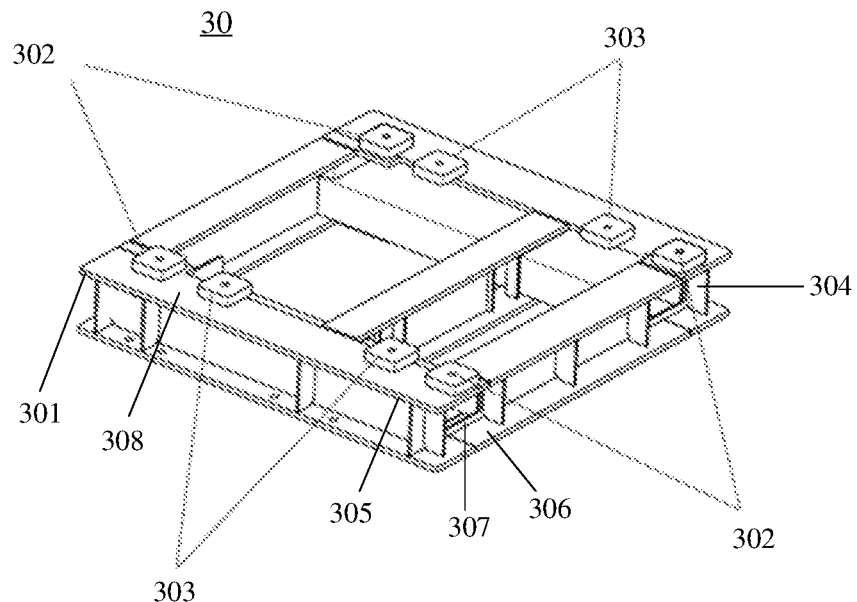
FIG. 3 is a schematic block diagram of a bearing base provided by at least one embodiment of the present disclosure.

For example, in some embodiments, as shown in FIG. 3, the fracturing and power generation switchable apparatus 1 further includes a bearing base 30. The bearing base 30 is configured for carrying and fixing the plunger pump 40 or the electric generator 50. For example, the bearing base 30 is adapted to carry and fix the plunger pump 40 connected with the speed transmission device 20, and is also adapted to carry and fix the electric generator 50 connected with the speed transmission device 20. For example, the fracturing and power generation switchable apparatus 1 is configured to switch between the first state and the second state. Under the first state, the plunger pump 40 is fixed on the bearing base 30 and is connected with the speed transmission device 20, under this case, the switchable apparatus is supplied as a fracturing apparatus. The fracturing apparatus is configured to pressurize the fracturing fluid transported in the well site and sends the fracturing fluid into the wellhead. In the second state, the electric generator 50 is fixed on the bearing base 30 and is connected with the speed transmission device 20, under this case, and the switchable apparatus is configured as a power generation apparatus. The power generation apparatus can provide power generating by the power generation apparatus to apparatuses that need electricity. For example, in the case where the fracturing and power generation switchable apparatus 1 is supplied in the well site, and power supply devices in the well site are not enough or power supply is not enough, other switchable apparatuses 1 other than the switchable apparatus supplied as the fracturing apparatus can be supplied as power generation apparatuses, so that the power supply capacity of the well site is provided. The fracturing and power generation switchable apparatus 1 provided by the embodiments of the present disclosure can reduce a number of the electric generators in the well site, so that the space occupied by the well site device is reduced.

For example, in some embodiments, as shown in FIG. 3, the bearing base 30 includes a bearing component 301, first fixing plates 302, and second fixing plates 303. For example, the first fixing plates 302 and the second fixing plates 303 are arranged on a bearing surface 308 of the bearing component 301. For example, the bearing surface 308 includes four rectangular surfaces, the first fixing plates 302 and the second fixing plates 303 are arranged at two opposite sides of the bearing surface 308, and the number of the first fixing plates 302 and the number of the second fixing plates 303 are both multiple and are arranged at intervals. For example, the first fixing plates 302 and the second fixing plates 303 are fixing blocks with threaded holes or fixing holes, respectively. For example, the bearing component 301 is configured to carry the plunger pump 40 or the electric generator 50, the first fixing plates 302 are adapted to fix the plunger pump 40, and the second fixing plates 303 are adapted to fix the electric generator 50. Positions of the first fixing plates 302 (for example, the threaded holes or the fixing holes in the first fixing plates 302) is configured with a fixing structure (for example, is located at the bottom surface of the plunger pump 40) corresponding to the plunger pump 40, to fix the plunger pump 40, so that in the case where the switchable apparatus is operating in the first state, the plunger pump 40 can be firmly connected with the speed transmission device 30. Positions of the second fixing plates 303 (for example, the threaded holes or fixing holes in the second fixing plate 303) is configured with a fixing structure (for example, is located at the bottom surface of the electric generator 50) corresponding to the electric generator 50, to fix the electric generator 50, so that in the case where the switchable apparatus operates in the second state, the electric generator 50 can be firmly connected with the speed transmission device 30.

It should be noted that the embodiments of the present disclosure are not limited to a specific structure of the bearing component 301, the first fixing plates 302 and the second fixing plates 303 can respectively fix the plunger pump and the electric generator.

It should be noted that the embodiments of the present disclosure are not limited to the specific structure of the bearing component 301, the number of both the first fixing plates 302 and the second fixing plates 303 can be set according to related structures of the plunger pump 40 and the electric generator 50, the number of both the first fixing plates 302 and the second fixing plates 303 provided by the embodiments of the present disclosure are not limited to these.

For example, as shown in FIG. 3, the bearing base 30 further includes a supporting frame 304, a top plate 305, a bottom plate 306, and a relief groove 307. The support frame 304 is located between the top plate 305 and the bottom plate 306 to support the top plate 305 and the bottom plate 306. For example, the upper surface of the top plate 305 includes the bearing surface 308. The relief groove 307 is located between the top plate 305 and the bottom plate 306, and during a process of transportation, a forklift frame of a forklift truck can be inserted into the relief groove 307 to unload or carry the bearing base 30 by the forklift truck.

For example, in some embodiments, as shown in FIG. 1, FIG. 2A, and FIG. 2B, the power device 10 may include a turbine engine 101. For example, the speed transmission device 20 may include a speed reducer 201. For example, the electric generator 50 may include a power generation unit. For example, after being decelerated by the speed reducer 201, the driving force output by the turbine engine 101 can provide power input for both the plunger pump and the electric generator 50. The output shaft of the turbine engine 101 and the input shaft (not explicitly shown) of the speed reducer 201 are connected with each other by a flange 202 (shown in FIG. 1). In the case where the switchable apparatus 1 is in the first state (that is, the switchable apparatus 1 is supplied as a fracturing apparatus), the output shaft 2012 of the speed reducer 201 is directly connected with the input shaft of the plunger pump 40, or the output shaft 2012 of the speed reducer 201 and the input shaft of the plunger pump 40 are connected with each other by a coupling 203 to complete a power transmission output. In the case where the switchable apparatus 1 is in the second state (that is, the switchable apparatus 1 is supplied as the power generation apparatus), the output shaft 2012 of the speed reducer 201 is directly connected with the input hole of the electric generator 50, or the output shaft 2012 of the speed reducer 201 and the input hole of the electric generator 50 are connected with each other by a coupling 203 to complete the power transmission output. Therefore, the structure of the switchable apparatus 1 is compact and occupies less space.

For example, as shown in FIG. 2B, the speed transmission device 20 further includes a torque limiter 2013, and the speed reducer 201 and the torque limiter 2013 are connected with each other. The output end of the torque limiter 2013 is connected with the coupling 203, so as to better control power output by the speed transmission device 20.

For example, the coupling 203 includes a flexible coupling, a transmission shaft, and a clutch. The embodiments of the present disclosure are not limited to these.

For example, in the embodiments of the present disclosure, the plunger pump 40 and the electric generator 50 are not connected with the speed reducer 201 at the same time.

Figure 4A:
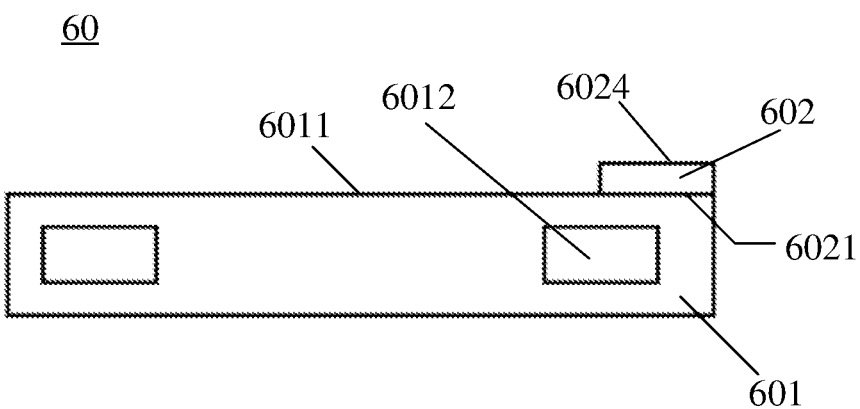
FIG. 4A is a schematic front view of a first connection unit provided by at least one embodiment of the present disclosure.
Figure 4B:
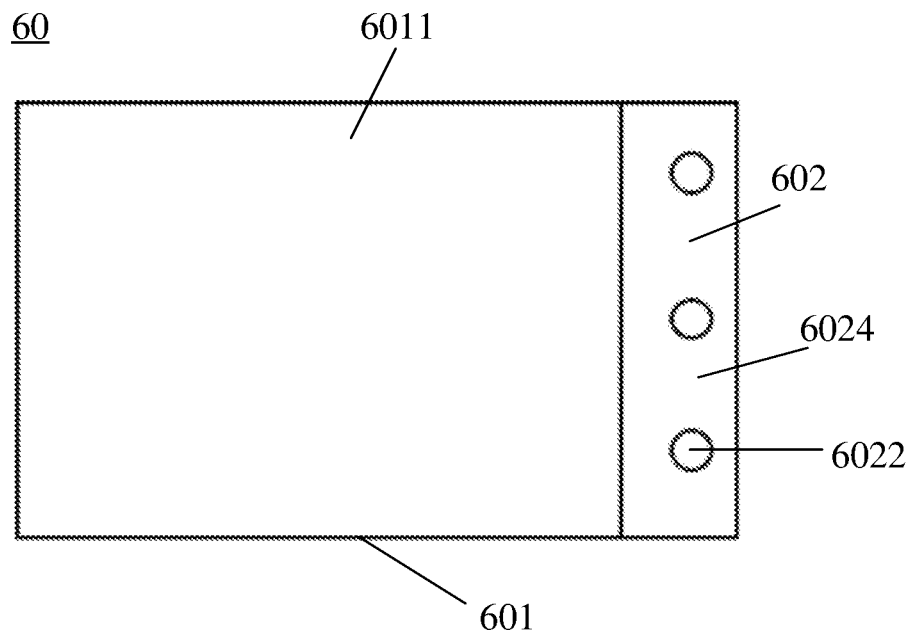
FIG. 4B is a schematic top view of the first connection unit as shown in FIG. 4A.

FIG. 4A is a schematic front view of a first connection unit provided by at least one embodiment of the present disclosure; and FIG. 4B is a schematic top view of the first connection unit as shown in FIG. 4A.

For example, in some embodiments, as shown in FIG. 4A, the first connection unit 60 is detachably arranged on the electric generator 50 and the plunger pump 40, respectively. The electric generator 50 is connected with pipelines required for the operation of the electric generator 50 by the first connection unit 60, and the plunger pump 40 is connected with pipelines required for the operation of the plunger pump 40 by the first connection unit 60. For example, the first connection unit is installed to the electric generator 50 or the plunger pump 40 through a connection port 6012. Through the first connection unit 60, the plunger pump 40 or the electric generator 50 can be quickly connected with pipelines required for operation, so that the switchable apparatus 1 can quickly switch between the first state and the second state.

It should be noted that the structures of the first connection unit shown in the drawings of the embodiments of the present disclosure are schematic.

For example, in some embodiments, as shown in FIG. 4A and FIG. 4B, the first connection unit 60 includes a base 601 and a connection structure 602. The connection structure 602 is movably connected with the base 601. For example, the connection structure 602 and the base 601 can be connected by structures such as bolts or pins, so that the connection structure 602 can turn over or move relative to the base 601.

For example, in some embodiments, as shown in FIG. 4B, the connection structure 602 includes a plurality of interfaces 6022, and the plurality of interfaces 6022 are configured to connect the pipelines required for the operation of the plunger pump 40 or the electric generator 50. For example, the connection structure 602 is arranged with interfaces (for example, quick connectors) for connecting lubricating pipelines, control cables, or hydraulic pipelines. The plurality of interfaces 6022 are configured to connect with at least one selected from the group consisting of the lubrication pipelines, the control cables, sensor wires, and the hydraulic pipelines. That is, the pipelines required for the operation of the electric generator 50 or the plunger pump 40 are concentrated in several interfaces and are directly connected, which can speed up the connection and installation.

For example, as shown in FIG. 4A and FIG. 4B, a plurality of interfaces 6022 pass through a plug-in surface 6024 of the connection structure 602. In the case where the connection structure 602 is not connected with the pipelines required for the operation of the power generating device 50 or the plunger pump 40 (for example, a non-working state of the switchable apparatus 1 or a configuration state of the switchable apparatus 1), the plug-in surface 6024 of the connection structure 602 overlaps with the surface 6011 of the base 601. For example, the plug-in surface 6024 is located at a main surface of the connection structure 602. That is, in the case where the main surface of the connection structure 602 is a surface with a largest area of the connection structure 602 facing upward in the state of the connection structure 602 as shown in FIG. 4A and FIG. 4B. In the case where the main surface is a plane, the plug-in surface 6024 and the main surface are arranged in a same plane. For example, the surface of the connection structure 602 opposite to the plug-in surface 6024 is a bottom surface 6021, and the bottom surface 6021 is attached to the surface 6011 of the base 601. Under this case, the first connection unit 60 is in a folded state, and a transportation size of the first connection unit 60 can be reduced, which is convenient for transportation and storage.

Figure 5A:
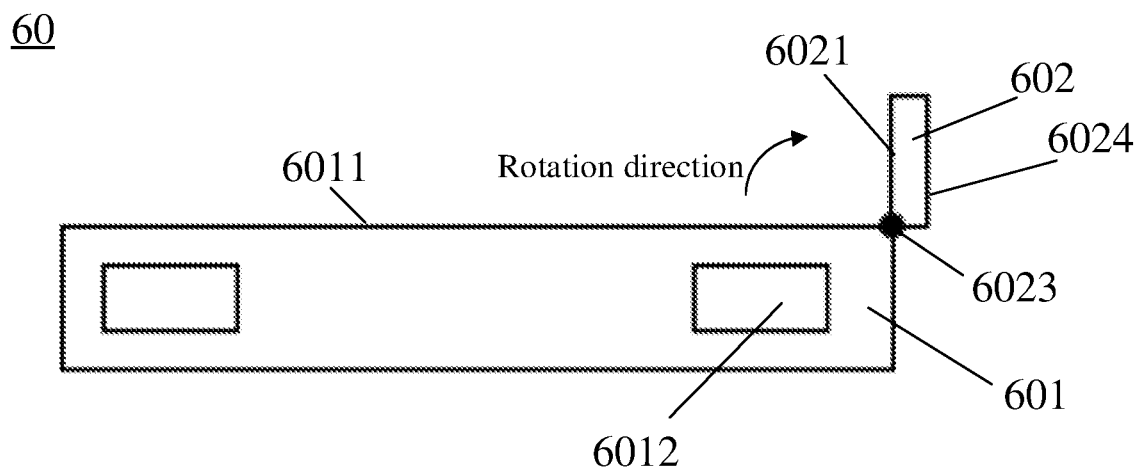
FIG. 5A is a schematic front view of the first connection unit as shown in FIG. 4A in an unfolded state.
Figure 5B:
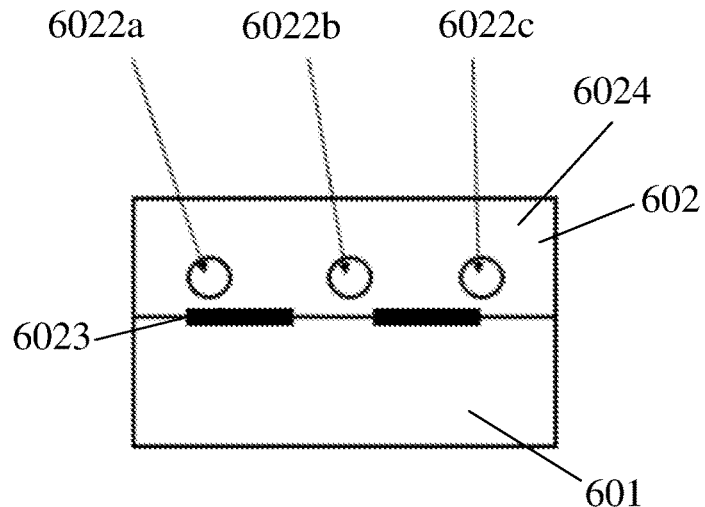
FIG. 5B is a schematic side view of the first connection unit as shown in FIG. 5A.
Figure 6A:
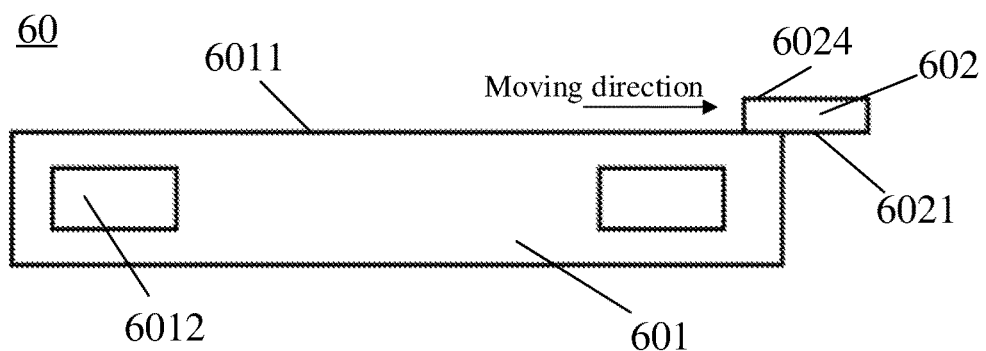
FIG. 6A is another schematic front view of the first connection unit as shown in FIG. 4A in an unfolded state.

FIG. 5A is a schematic front view of the first connection unit as shown in FIG. 4A in an unfolded state; FIG. 5B is a schematic side view of the first connection unit as shown in FIG. 5A; FIG. 6A is another schematic front view of the first connection unit as shown in FIG. 4A in an unfolded state; and FIG. 6B is a schematic top view of the first connection unit as shown in FIG. 6A.

For example, in some embodiments, as shown in FIG. 5B and FIG. 6A, the plurality of interfaces 6022 include a first interface 6022a, a second interface 6022b, and a third interface 6022c. For example, in the case where the plurality of interfaces 6022 are connected with the pipelines required for the operation of the electric generator 50, the first interface 6022a is configured for quickly plugging with the lubrication pipelines, the second interface 6022b is configured for quickly plugging with the control cables, and the third interface 6022c is configured for quickly plugging with the sensor wires. For example, in the case where the plurality of interfaces 6022 are connected with the pipelines required for the operation of the plunger pump 40, the first interface 6022a is configured for quickly plugging with the lubrication pipelines, the second interface 6022b is configured for quickly plugging with the control cables, and the third interface 6022c is configured for quickly plugging with the hydraulic pipelines. It should be noted that a number of the plurality of interfaces 6022 is not limited to three, and can be set according to the number of interfaces required by the pipelines required for the operation of the power generating device 50 or the plunger pump 40, which is not limited in the embodiments of the present disclosure.

For example, in some embodiments, as shown in FIG. 5A and FIG. 5B, the connection structure 602 and the base 601 are rotatably connected. For example, the connection structure 602 is hinged with the base 601. The connection structure 602 and the base 601 are connected by a connection component 6023. The connection component 6023 can make the connection structure 602 rotate relative to the base 601 in a rotation direction of FIG. 5A. In the case where the connection structure 602 is connected with the pipelines required for the operation of the electric generator 50 or the plunger pump 40 (for example, in the operating state of the switchable apparatus 1 (supplied as the fracturing apparatus or the power generation apparatus)), the plug-in surface 6024 (and the bottom surface 6021) of the connection structure 602 rotates toward a side away from the surface of the base 601, so that the bottom surface 6021 is perpendicular to the surface 6011 of the base 601, and the connection structure 602 is connected with the pipelines required for the operation of the power generating device 50 or the plunger pump 40. Under this case, after the first connection unit 60 is installed on the turbine engine 101, the first connection unit 60 is unfolded (for example, by a method of rotating 90°), the lubrication pipelines, the control cables, the sensor wires required in the case where the generator is working are quickly connected by the interfaces 6022.

Figure 6B:
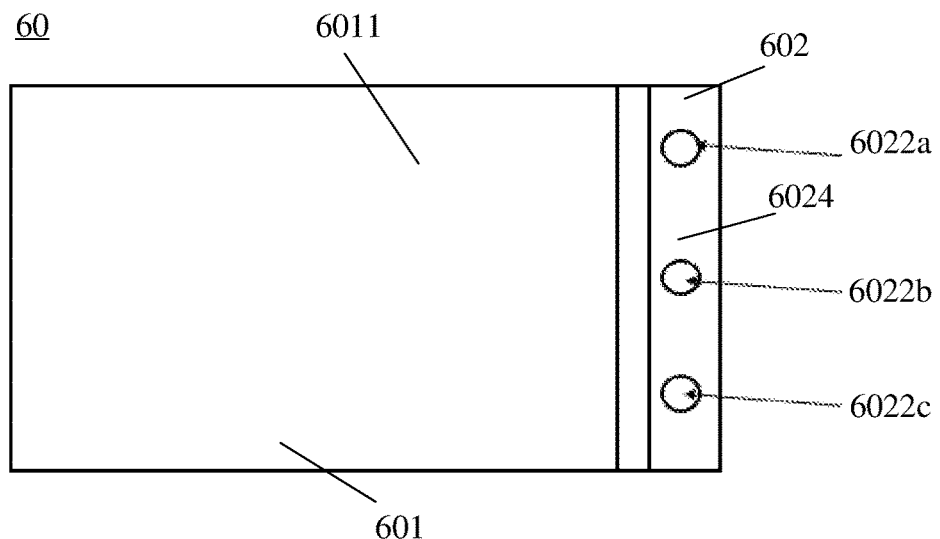
FIG. 6B is a schematic top view of the first connection unit as shown in FIG. 6A.

For example, in some embodiments, as shown in FIG. 6A and FIG. 6B, the connection structure 602 is movably connected with the base 601. For example, the connection structure 602 is connected with the plug-in surface 6024 (and the bottom surface 6021) in a scalable mode. For example, a sliding rail is arranged at the bottom surface 6021 of the connection structure 602, so that the connection structure 602 can be moved on the base 601. In the case where the connection structure 602 is connected with the pipelines required for the operation of the electric generator 50 or the plunger pump 40 (for example, in the working state of the switchable apparatus 1 (supplied as the fracturing apparatus or the power generation apparatus)), the plug-in surface 6024 (and the bottom surface 6021) of the connection structure 602 moves to a side away from the base 602, that is, the bottom surface 6021 of the connection structure 602 moves along a moving direction in FIG. 6A, so that the orthographic projection of the plug-in surface 6024 of the connection structure 602 on the plane parallel to the surface 6011 of the base 601 is at least partially located outside the surface 6011 of the base 601, and the bottom surface 6021 of the connection structure 602 extends beyond the surface 6011 of the base 601, so that the bottom surface 6021 of the connection structure 602 is exposed, and the connection structure 602 is connected with the pipelines required for the operation of the electric generator 50 or the plunger pump 40. In the case where the electric generator 50 or the plunger pump 40 connected with the first connection unit 60 is in the working state, the connection structure 602 moves to the outside of the base 601, so that the bottom surface 6021 extends beyond the surface 6011 of the base 601, the connection structure 602 is connected with other pipelines. FIG. 6A and FIG. 6B are compared with FIG. 5A and FIG. 5B, the connection structure 602 has changed from a rotational movement mode to a movement mode along a straight line or an oblique line. The embodiment of the present disclosure is not limited to the movable mode of the connection structure 602 relative to the base 601.

For example, in some embodiments, as shown in FIG. 2B, the switchable apparatus 1 is detachably arranged with a second connection unit, the second connection unit is configured to connect (for example, electrically connect) with an electric generator that supplies power to the switchable apparatus 1. For example, the electric generator can also transmit electric energy to a power supply system in the well site where the switchable apparatus 1 is located, then the electric energy is transmitted to the switchable apparatus 1 from the power supply system. For example, the electric generator is electrically connected with the switchable apparatus 1 to supply power to devices that need to be powered (such as a meter, a display, etc.) in the switchable apparatus 1. For example, the electrical energy output by the electric generator can also be directly transmitted to the switchable apparatus 1 through operations such as voltage transformation, which are not limited in the embodiments of the present disclosure. For example, the second connection unit may have a structure similar to that of the first connection unit (as shown in FIG. 4A, FIG. 4B, FIG. 5A, FIG. 5B, FIG. 6A, and FIG. 6B), which will not be described here again. For example, the second connection unit is provided with interfaces such as control cables, lubrication pipes, and hydraulic pipes. That is, the pipelines required for the switchable apparatus 1 to be powered are concentrated into several interfaces and are directly connected, so that the connection and installation speed can be accelerated. In the case where the switchable apparatus 1 in the well site needs to be powered, other switchable apparatus 1 can be switched to the second state to be supplied as a power generation apparatus, the electric generator is connected with the switchable apparatus that needs power supply, so that the power supply capacity of the well site is improved, and the space occupied by the devices at the well site is reduced.

Figure 7:
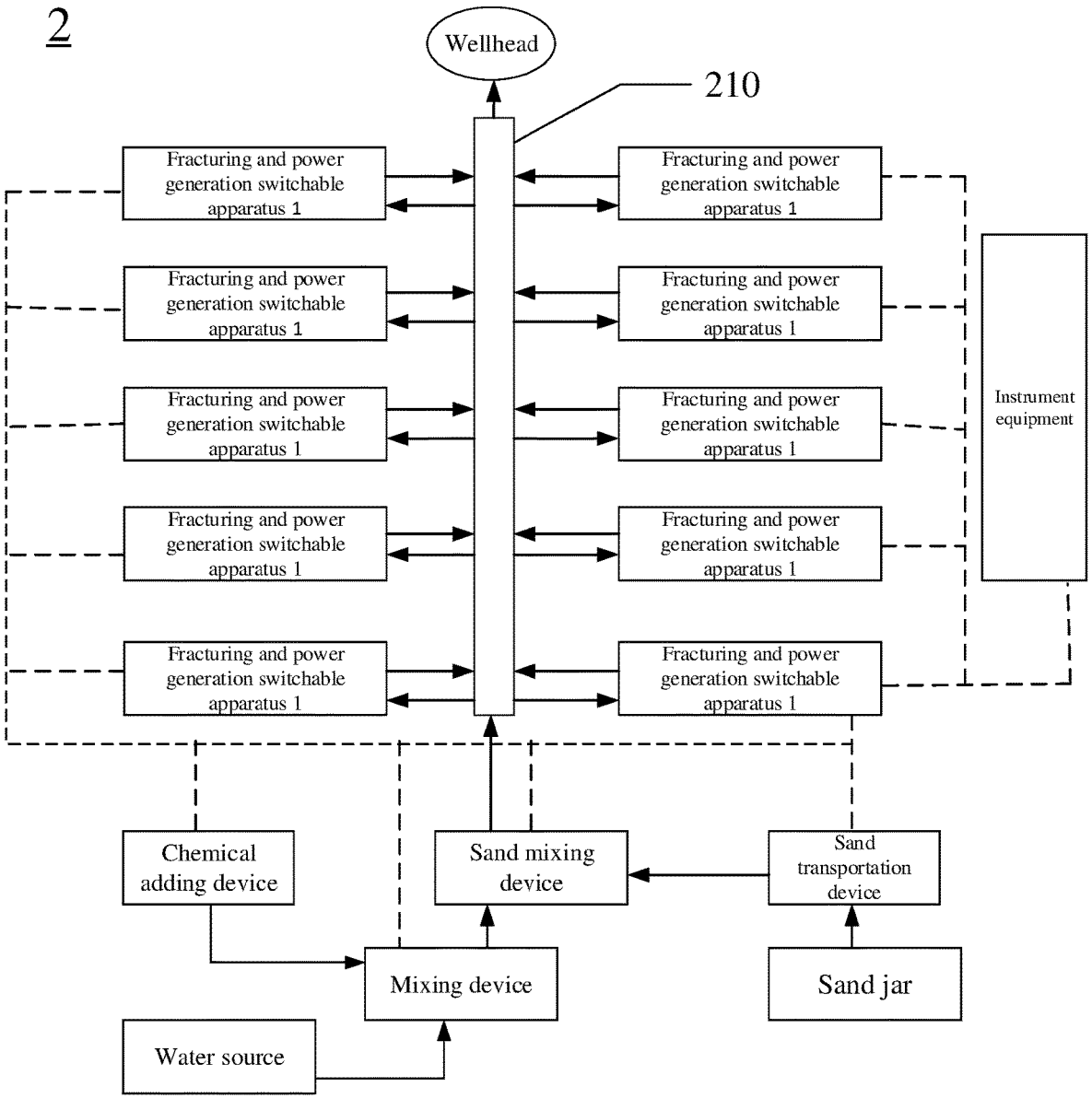
FIG. 7 is a schematic diagram of a layout of a well site provided by at least one embodiment of the present disclosure.

FIG. 7 is a schematic diagram of a layout of a well site provided by at least one embodiment of the present disclosure.

For example, as shown in FIG. 7, the well site 2 includes a manifold 210 and a plurality of fracturing and power generation switchable apparatuses each of which is the fracturing and power generation switchable apparatus described in the above embodiments. The manifold 210 is configured to transport fracturing fluid. The plurality of fracturing and power generation switchable apparatuses 1 are arranged at two sides of the manifold 210 and are connected with the manifold 210 to pressurize the fracturing fluid. At least one of the plurality of fracturing and power generation switchable apparatuses 1 is configured to work in the first state, that is, is supplied as the fracturing apparatus. The plurality of fracturing and power generation switchable apparatuses 1 in the well site 2 can quickly switch between the first state and the second state (supplied as the power generation apparatus). For example, in the case where the speed transmission devices 20 of plurality of fracturing and power generation switchable apparatuses 1 are connected with the plunger pumps 40, respectively, the switchable apparatuses 1 are supplied as the fracturing apparatuses, and in the case where the speed transmission devices 20 of the switchable apparatuses 1 are connected with the electric generators 50, respectively, the switchable apparatuses 1 are supplied as power generation apparatuses. In the FIG. 7, the solid arrows indicate manifold connections, the solid lines indicate hydraulic fluid, the arrows point to directions of content (such as fracturing fluid), and the dashed lines indicate cable control and can also indicate mechanical connections between components. For example, the hydraulic pressure of the fracturing fluid can be detected by an instrumentation device, and the fracturing fluid is input into the manifold 210 from a sand mixing device through a sand transportation device. Sand material of the fracturing fluid is manufactured in a mixing device.

Figure 8:
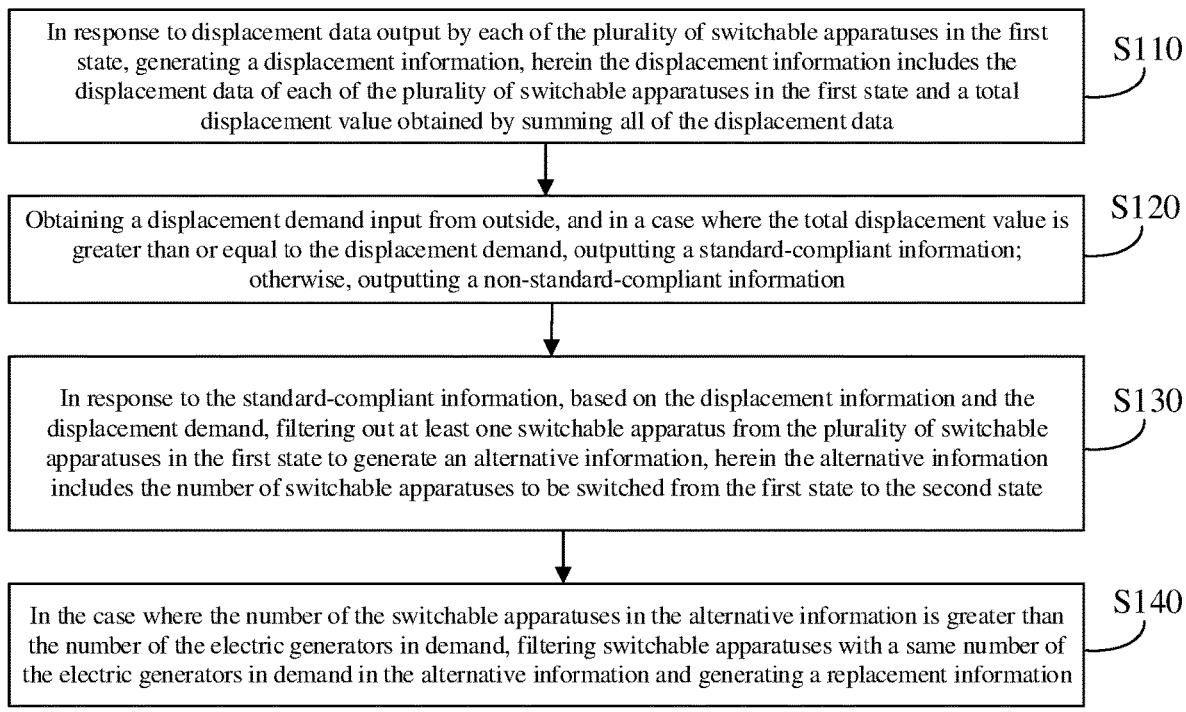
FIG. 8 is a schematic flow chart of a control method of the well site as shown in FIG. 7 provided by at least one embodiment of the present disclosure.

FIG. 8 is a schematic flow chart of a control method of the well site as shown in FIG. 7 provided by at least one embodiment of the present disclosure. The control method of the well site provided by the embodiment of the present disclosure shown in FIG. 8 includes step S110 to step S140.

Step S110: in response to displacement data output by each of the plurality of switchable apparatuses in the first state, generating a displacement information, herein the displacement information includes the displacement data of each of the plurality of switchable apparatuses in the first state and a total displacement value obtained by summing all of the displacement data.

For example, in some embodiments, the displacement data of the switchable apparatuses supplied as the fracturing apparatuses in the well site is calculated, and the total displacement of the switchable apparatuses supplied as the fracturing apparatuses is calculated.

Step S120: obtaining a displacement demand input from outside, and in a case where the total displacement value is greater than or equal to the displacement demand, outputting a standard-compliant information; otherwise, outputting a non-standard-compliant information.

For example, in some embodiments, the displacement demand of the fracturing fluid required by the wellhead of the well site is input to compare with the total displacement of the switchable apparatuses supplied as the fracturing apparatuses in the displacement information. In the case where the total displacement value is greater than or equal to the displacement demand, it indicates that the displacement of the switchable apparatuses supplied as the fracturing apparatuses is sufficient or has a surplus. In the case where the total displacement value is greater than the displacement demand, and the switchable apparatuses supplied as the fracturing apparatuses meets the displacement demand, the surplus switchable apparatuses supplied as the fracturing apparatuses can be switched to the second state, that is, supplied as the power generation apparatuses. In the case where the total displacement value is less than a standard-compliant information, it indicates that the displacement of the switchable apparatuses supplied as the fracturing apparatuses is not enough for the requirement of the well site, and under this case, no redundant switchable apparatus is supplied as the power generation apparatus.

For example, both the standard-compliant information and the non-standard-compliant information are instructional information.

For example, in some embodiments, in the case where the switchable apparatus in the first state in the well site is powered off, if no standard-compliant information or non-standard-compliant information is output, abnormal information is output. For example, the abnormal information indicates that communication failure is occurred at the well site, and the working status of the switchable apparatuses cannot be monitored normally. Under this case, it is necessary to troubleshoot, for example, the operation can be suspended to allow the staff to go for maintenance.

For example, power failure situations of the apparatuses in the well site can be realized by ammeters or voltmeters on various circuit of the well site.

For example, in the case where the switchable apparatus in the first state in the well site is not powered off, saturation information is output. In response to the saturation information, an operator can send out recovery steps for recovering information. For example, an unneeded power supply apparatus such as the switchable apparatus in the second state, is switched to the first state for standby.

For example, in some embodiments, in the case where the plurality of switchable apparatuses in the first state in the well site are powered off, if the standard-compliant information is received, in respond to a single power data and a power demand data input from the outside, the number of required electric generators is determined by a calculation method of the power demand data divided by the unit power data and the calculation result has been rounding up. That is, the power demand required by the well site, under this case, is divided by the single power that can be generated in the case where the switchable apparatus is working in the second state supplied as the power generation apparatus, and the result obtained is an integer, if the result is a non-integer, the result will be directly carried. This integer represents the number of the electric generators currently needed, that is, the number of the switchable apparatuses that need to work in the second state.

Step S130: in response to the standard-compliant information, based on the displacement information and the displacement demand, filtering out at least one switchable apparatus from the plurality of switchable apparatuses in the first state to generate an alternative information, herein the alternative information includes the number of switchable apparatuses to be switched from the first state to the second state.

Figure 9:
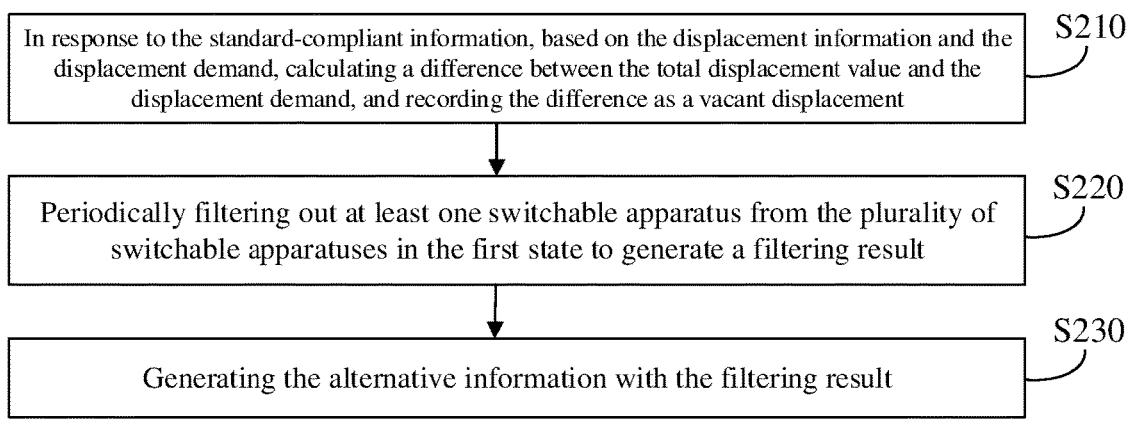
FIG. 9 is a schematic flow chart of a control method of the well site as shown in FIG. 7 provided by at least one embodiment of the present disclosure.

FIG. 9 is a schematic flow chart of a control method of the well site as shown in FIG. 7 provided by at least one embodiment of the present disclosure. The control method for the well site provided by the embodiments of the present disclosure as shown in FIG. 9 includes step S210 to step S230. Step S130 includes step S210 to step S230.

Step S210: in response to the standard-compliant information, based on the displacement information and the displacement demand, calculating a difference between the total displacement value and the displacement demand, and recording the difference as a vacant displacement.

Step S220: periodically filtering out at least one switchable apparatus from the plurality of switchable apparatuses in the first state to generate a filtering result.

For example, in some embodiments, the filtering condition for periodically filtering out at least one switchable apparatus from the plurality of switchable apparatuses in the first state is as follows: periodically filtering out at least one switchable apparatus according to the displacement data of the plurality of switchable apparatuses (supplied as the fracturing apparatuses) in the first state in the order of displacement data of the plurality of switchable apparatuses from small to large. The sum of the displacement data of at least one switchable apparatus filtered is smaller than the vacant displacement. That is, under the condition that the displacement demand of the well site is met, the switchable apparatuses with the smaller displacement data are selected to be supplied as the power generation apparatuses first, in this way, it is convenient for the operator to confirm the compliance status and to lock the confirmation status of the fracturing apparatuses with lower displacements, and the plurality of switchable apparatuses (the fracturing apparatuses) in the first state that can be converted into the power generation apparatuses without affecting the overall discharge standard are identified.

Step S230: generating the alternative information with the filtering result. For example, the filtering result includes the plurality of filtered switchable apparatuses that can be switched from the first state to the second state, and these filtered switchable apparatuses are supplied as the power generation apparatuses. For example, based on the filtering process and the filtering condition of the switchable apparatuses in step S220, the filtering results include relevant information about the switchable apparatuses that can be switched from the first state to the second state, for example, the locations of the filtered switchable apparatuses in the well site or the number of the corresponding apparatuses, the operator can set according to the convenient operation methods, so that the filtered switchable apparatuses are more quickly located, and these switchable apparatuses are supplied as the power generation apparatuses.

Step S140: in the case where the number of the switchable apparatuses in the alternative information is greater than the number of the electric generators in demand, filtering switchable apparatuses with a same number of the electric generators in demand in the alternative information and generating a replacement information.

For example, in some embodiments, the filtering switchable apparatuses with the same number of the electric generators in demand in the alternative information and generating the replacement information, includes: filtering the switchable apparatuses with the same number of the electric generators in demand according to the order from small to large of the displacement data of the switchable apparatuses in the first state in the alternative information, and generating the replacement information based on the filtered switchable apparatuses with the same number of the electric generators in demand. That is, if the number of the filtered switchable apparatuses that can be switched to the second state is greater than the number of the switchable apparatuses that need to be switched to the second state, the switchable apparatuses (the fracturing apparatus) working in the first state with smaller displacement are preferentially selected and switched to the second state (supplied as the power generation apparatuses), thereby reducing the displacement waste of the switchable apparatuses in the first state in the well site can be reduced.

The control method of the well site provided by the embodiments of the present disclosure can improve the power supply capability in the well site while meeting the displacement demand of the well site.

For example, in other embodiments, as shown in FIG. 7, in the case where the displacement demand of the well site is met, two fracturing and power generation switchable apparatuses 1 at a side away from the wellhead can be chosen to switch to the second state (supplied as the power generation apparatuses), thereby reducing the displacement waste of the switchable apparatuses 1 supplied as the fracturing apparatuses, improving the energy utilization, and reducing the power consumption.

For example, in other embodiments, as shown in FIG. 7, in the case where the power supply devices of the fracturing and power generation switchable apparatuses 1 in the well site breaks down and needs other apparatuses to supply power, under the condition that the displacement demand of the well site is met, the principle of proximity can be adopted to switchable the switchable apparatus 1 that is nearest to the switchable apparatus 1 needing power supply to the second state, that is, supplied as the power generation apparatus.

For example, in some embodiments, in response to the replacement information, the filtered switchable apparatuses with the same number of electric generators in demand are switched to the second state. That is, the filtered switchable apparatuses with the same number of required power generation apparatuses are supplied as the power generation apparatuses to supply power to other switchable apparatuses supplied as the fracturing apparatuses.

For example, in some embodiments, in the case where the number of the switchable apparatuses in the alternative information is not greater than the number of the electric generators in demand, the replacement information is generated based on all of the switchable apparatuses of the alternative information, under this case, a warning information is generated and the warning information is output. That is, in the case where the switchable apparatuses in the alternative information ensure the displacement demand of the well site, other switchable apparatuses are remained in the well site, the other switchable apparatuses can be supplied as the power generation apparatuses. In the case where the number of the switchable apparatuses that can be supplied as the power generation apparatuses in the well site is insufficient, and under the condition that the displacement demand of the well site is met, other switchable apparatuses are all supplied as the power generation apparatuses. The staff can obtain other electric generators according to the warning information to meet the power supply demand of the well site.

It should be noted that the fracturing and power generation switchable apparatuses described in the embodiments of the present disclosure can be switched from the first state to the second state, and can also be switched from the second state to the first state. That is, the fracturing and power generation switchable apparatuses can be supplied as the power generation apparatuses and the fracturing apparatuses, and can be flexibly switched.

Figure 10:
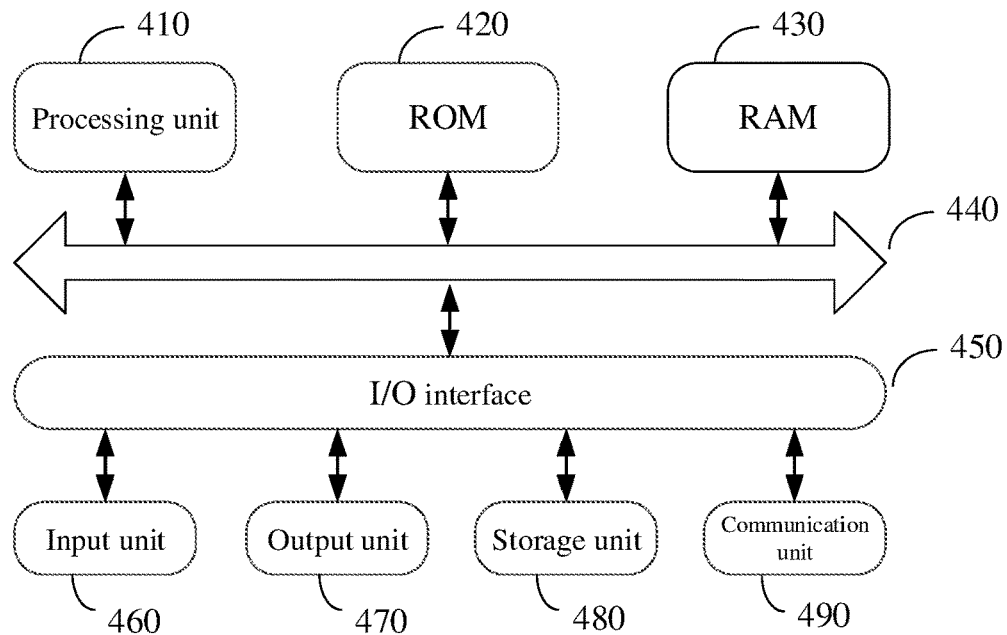
FIG. 10 is a structural schematic diagram of a control device used in the well site shown in FIG. 7 provided by at least one embodiment of the present disclosure.

FIG. 10 is a structural schematic diagram of a control device used in the well site shown in FIG. 7 provided by at least one embodiment of the present disclosure.

The control device 400 for the well site shown in FIG. 10 is, for example, suitable for implementing the control method of the well site provided by the embodiments of the present disclosure. The control device 400 used for the well site may be a terminal device such as a personal computer, a notebook computer, a tablet computer, and a mobile phone, a workstation, a server, or a cloud service, etc. It should be noted that the control device 400 used for the well site as shown in FIG. 10 is only an example, which will not bring any restrictions on the function and application scope of the embodiments of the present disclosure.

As shown in FIG. 10, the control device 400 used in the well site may include a processing unit (such as a central processing unit, a graphics processor, etc.) 410, which can perform various appropriate actions and processes according to a program stored in a read-only memory (ROM) 420 or a program loaded from a storage unit 480 into a random access memory 430 (RAM). In the RAM 430, various programs and data required for the operation of the control device 400 of the well site are also stored. The processing unit 410, the ROM 420, and the RAM 430 are connected with each other through a bus 440. An input/output (I/O) interface 450 is also connected with the bus 440.

Generally, the following units can be connected with the I/O interface 450: an input unit 460 including such as a touch screen, a touch pad, a keyboards, a mouse, a camera, a microphone, an accelerometer, and a gyroscope, etc.; an output unit 470 including such as a liquid crystal display (LCD), a speaker, and a vibrator, etc.; a storage unit 480 including such as a magnetic tape, and a hard disk, etc., and a communication unit 490. The communication unit 490 may allow the control device 400 used for the well site to exchange data with other electronic units through wireless communication or wired communication. Although FIG. 9 shows a control device 400 for a well site including various units, it should be understood that all the units as shown in FIG. 9 are not required to be implemented or provided, the control device 400 used for the well site may alternatively be implemented or provided with more or fewer units.

For example, according to the embodiments of the present disclosure, the above-mentioned control method of the well site may be implemented as a computer software program. For example, the embodiments of the present disclosure include a computer program product, which includes a computer program carried on a non-transitory computer readable medium, the computer program includes program codes for executing the above-mentioned control method of the well site. In such an embodiment, the computer program can be downloaded and installed from the network through the communication unit 490, can be installed from the storage unit 480, or can be installed from the ROM 420. In the case where the computer program is executed by the processing unit 410, the functions defined in the control method of the well site provided by the embodiments of the present disclosure can be executed.

At least one embodiment of the present disclosure further provides a storage medium, which is configured to store non-transitory computer program executable codes (such as computer executable instructions), in the case where the non-transitory computer program executable codes are executed by a computer, the control method of the well site according to any embodiments of the present disclosure can be realized; or, in the case where the non-transitory computer program executable codes are executed by a computer, the control method of the well site described in any embodiments of the present disclosure can be implemented.

Figure 11:
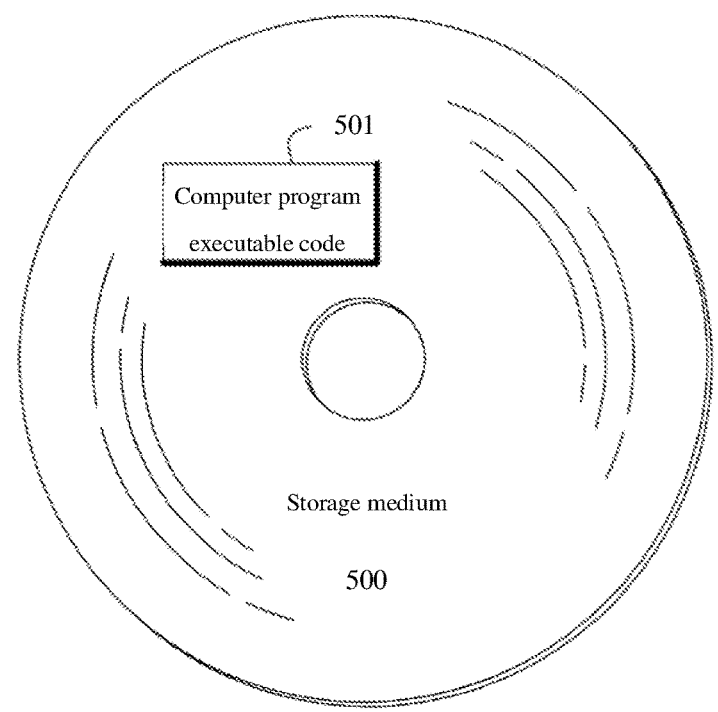
FIG. 11 is a schematic diagram of a storage medium provided by at least one embodiment of the present disclosure.

FIG. 11 is a schematic diagram of a storage medium provided by at least one embodiment of the present disclosure. As shown in FIG. 10, the storage medium 500 non-temporarily stores computer program executable codes 501. For example, in the case where the computer program executable codes 501 are executed by a computer, one or more steps in the control method of a well site described above can be executed.

For example, the storage medium 500 may be applied to the above-mentioned control device 400 of the well site. For example, the storage medium 500 may be a memory 420 in the control device 400 of the well site as shown in FIG. 10. For example, the relevant descriptions of the storage medium 500 can be referred to the corresponding descriptions of the memory 420 in the control device 400 for the well site as shown in FIG. 10, which is omitted herein.

The following statements should be noted:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

The above are merely specific implementations of the present disclosure without limiting the protection scope of the present disclosure thereto. Any person familiar with the technical field can easily think of changes or substitutions within the technical scope disclosed in the present disclosure, which should be covered within the protection scope of the present disclosure. Therefore, the protection scope of the present disclosure should be based on the protection scope of the appended claims.

What is claimed is:

1. A fracturing system comprising a power-load subsystem, the power-load subsystem comprising:
a power device;
a rotation transmission device connected with the power device; and
a bearing base configured for carrying and fixing a first load device,
wherein:
the bearing base comprises a first side frame structure and a second side frame structure opposite to the first side frame structure, the first side frame structure and the second side frame structure being connected by a plurality of bridging structures;
each of the first side frame structure and second side frame structure comprises a top supporting plate, a bottom supporting plate, and a relief groove along and between the top supporting plate and the bottom supporting plate, the relief groove being configured to accommodate a forklift arm;
the top supporting plate of the first side frame structure and the top supporting plate of the second side frame structure are each bolted with at least a first set of fixing plates directly above the relief groove for fixing the first load device; and
the bearing base is further configured to allow for a switching from the first load device to a second load device and to fix the second load device when the second load device is driven by the power device.

2. The fracturing system of claim 1, where the first load device is detachably provided with a first connection unit and wherein the first load device is connected with cables and/or fluid lines required for an operation of the first load device via the first connection unit.

3. The fracturing system of claim 2, wherein the first connection unit is configured to fit the second load device such that it is capable of being decoupled from the first load device and coupled to the second load device when switching the first load device with the second load device.

4. The fracturing system of claim 2, wherein:
the first connection unit comprises a base and a connection structure;
the connection structure is movably connected with the base;
the connection structure comprises a plurality of interfaces, the plurality of interfaces being configured to connect the cables and/or fluid lines required for the operation of the first load device, and the plurality of interfaces passing through a plug-in surface of the connection structure; and
when the connection structure is not connected with the cables and/or fluid lines required for the operation of the first load device, the connection structure is movable such that the plug-in surface of the connection structure overlaps with a surface of the base.

5. The fracturing system of claim 4, wherein:
the connection structure is rotatably connected with the base; and
when the connection structure is connected with the cables and/or fluid lines required for the operation of the first load device, the plug-in surface of the connection structure is configured to rotatable toward a side away from the surface of the base so that the plug-in surface becomes perpendicular to the surface of the base.

6. The fracturing system of claim 4, wherein when the connection structure is connected with the cables and/or fluid lines required for the operation of the first load device, the plug-in surface of the connection structure is configured to slide to a side away from the base, so that an orthographic projection of the plug-in surface of the connection structure on a plane parallel to the surface of the base is at least partially outside the surface of the base.

7. The fracturing system of claim 4, wherein the plurality of interfaces are configured to connect with at least one of lubrication pipelines, control cables, sensor wires, and hydraulic pipelines.

8. The fracturing system of claim 2, comprising a second connection unit detachably provided with the power-load subsystem and configured to couple with the second load device.

9. The fracturing system of claim 2, wherein the first load device comprises a first plunger pump.

10. The fracturing system of claim 9, wherein the second load device comprises a second plunger pump.

11. The fracturing system of claim 10, further comprising:
a manifold, configured to transport a fracturing fluid to a wellhead; and
a plurality of power-load subsystems of claim 9 connected with the manifold at two sides of the manifold, and at least one of the power-load subsystems is configured to operate with the first load device disposed therein.

12. The fracturing system of claim 11, further comprising a control circuitry configured to determine whether to switch the first load device of at least one of the plurality of the power-load subsystems to the second load device.

13. The fracturing system of claim 12, wherein the control circuitry is configured to determine whether to switch the first load device of the at least one of the plurality of the power-load subsystems to the second load device by monitoring a displacement rate of the fracturing fluid in the manifold.

14. The fracturing system of claim 11, wherein each of the plurality of power-load subsystems is disposed on a semi-trailer.

15. The fracturing system of claim 9, wherein the second load device comprises an electric generator.

16. The fracturing system of claim 15, further comprising:
a manifold, configured to transport a fracturing fluid to a wellhead; and
a plurality of power-load subsystems of claim 10 connected with the manifold at two sides of the manifold, and at least one of the power-load subsystems is configured to operate with the first load device disposed therein.

17. The fracturing system of claim 16, further comprising a control circuitry configured to determine whether to switch the first load device of at least one of the plurality of the power-load subsystems to the second load device.

18. The fracturing system of claim 17, wherein the control circuitry is configured to determine whether to switch the first load device of the at least one of the plurality of the power-load subsystems to the second load device by:
monitoring a total actual displacement of the fracturing fluid;
calculating a difference between the total actual displacement of the fracturing fluid and a displacement demand; and
selecting at least one first load device within the plurality of power-load subsystems to switch to the second load device based on the difference.

19. The fracturing system of claim 18, wherein the control circuitry is configured to select at least one first load device to switch to the second load device according to an ascending order of fracturing fluid displacement among the plurality of power-load subsystems.

20. The fracturing system of claim 1, wherein:
the power device comprises a turbine engine, and the rotation transmission device comprises a rotation speed reducer;
an output shaft of the turbine engine is connected with an input shaft of the rotation speed reducer by a flange; and
an output shaft of the rotation speed reducer is connected directly or via a coupler with an input of the first load device or the second load device.

* * * * *